United States Patent [19]

Reid

[11] Patent Number: 5,088,853
[45] Date of Patent: Feb. 18, 1992

[54] CONNECTOR

[75] Inventor: Michael A. Reid, Aberdeen, United Kingdom

[73] Assignee: Well-Equip Limited, Aberdeen, United Kingdom

[21] Appl. No.: 638,064

[22] Filed: Jan. 7, 1991

[30] Foreign Application Priority Data

Jan. 10, 1990 [GB] United Kingdom ............. 9000555

[51] Int. Cl.$^5$ .............................................. B25G 3/18
[52] U.S. Cl. ..................................... 403/330; 403/348; 403/349
[58] Field of Search ................... 403/348, 349, 330; 279/77; 285/402

[56] References Cited

U.S. PATENT DOCUMENTS 1,305,311  6/1919  Sheldon et al. ............... 403/348
2,219,907 10/1940  Ross ........................ 403/349 X

FOREIGN PATENT DOCUMENTS 320601 of 1972 U.S.S.R. ................. 403/349

Primary Examiner—Andrew V. Kundrat

[57] ABSTRACT

A connector is described which comprises a male member (20) and a female member (30; 40). The male member (20) has two longitudinally spaced sets of three circumferentially flanges (1). When the male member (20) is inserted into the female member (30; 40) the flanges (1) locate in co-operating recesses (11) defined by flanges (31) in a central bore (10) of the female member (30; 40). Located in the body of the female member (30; 40) is a latch (4; 41) which engages a corresponding slot (3) in the end of the male member (20) and prevents relative rotation between the male and female members after connection. The latch (4; 41) is pivotally mounted on the female member (30; 40) and is biassed into engagement with the slot (3) by a spring (6).

4 Claims, 2 Drawing Sheets

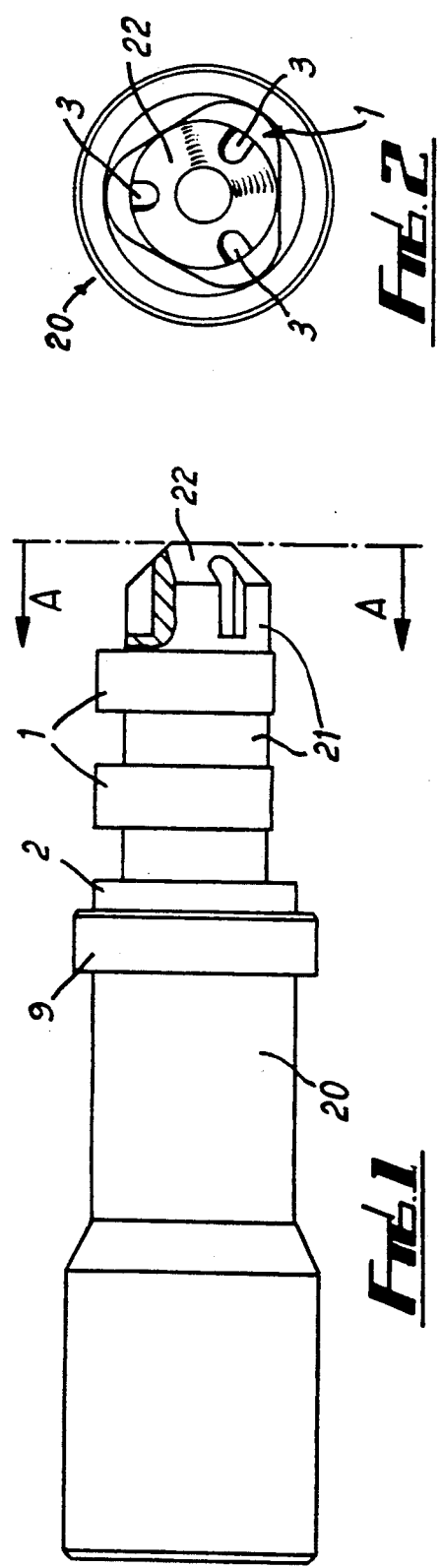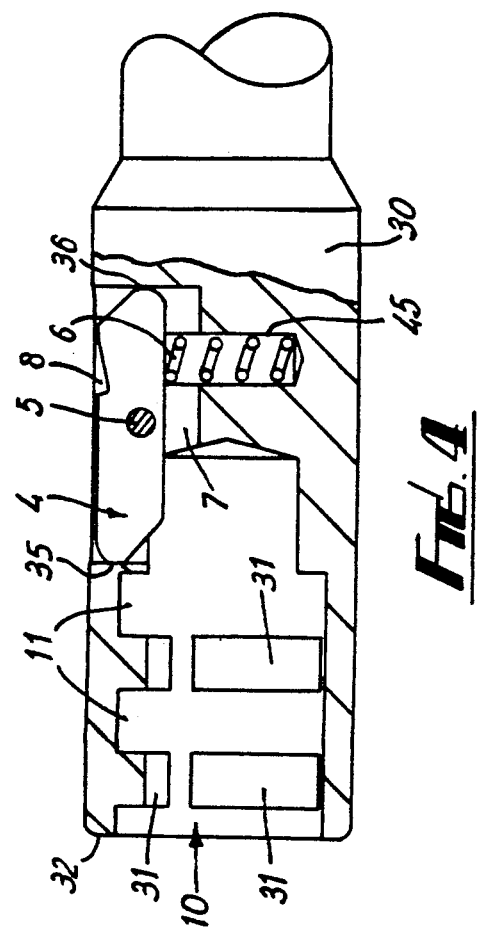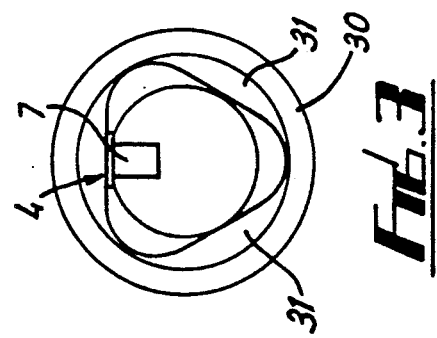

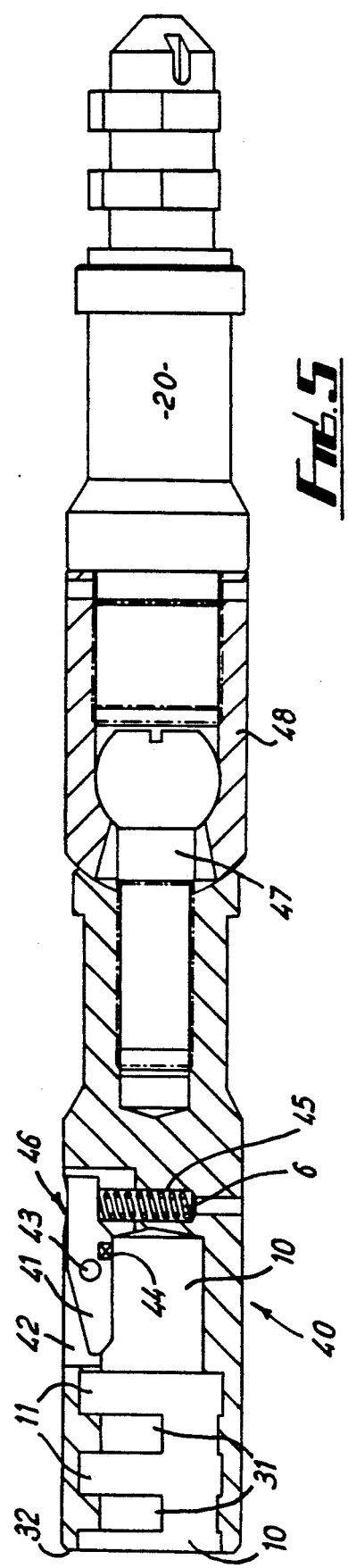

CONNECTOR

The invention relates to connectors.

BACKGROUND OF THE INVENTION

Wireline is a method of lowering specialised equipment into an oil or gas well, or raising specialised equipment from an oil or gas well. The principle of wireline is to attach a workstring or toolstring to the end of a reel of wire and by reeling out the wire the toolstring is lowered into the well. By either reeling in or reeling out the wire, the toolstring can be made to perform simple tasks downhole. The toolstring consists of a variable combination of individual tools connected together to form a working unit.

Originally, the individual tools were connected together by having co-operating threads provided on the end of each tool so that the tools could be screwed together and tightened using wrenches.

However, recently quick-locking connectors have been provided in which a male member having diametrically opposite flanges is inserted into a female member and rotated relative to the female member so that the flanges co-operate with recesses within the female member to lock the male member to the female member. Rotation of the male member relative to the female member is then prevented by means of a latch which is displaceable in a direction parallel to the longitudinal axis of the toolstring. The latch is mounted in the female member and engages with a slot in the male member to prevent the male and female members rotating after they have been connected together. This axially displaceable latch mechanism comprises a helical spring which acts in the longitudinal axial direction to force the latch member into engagement with the slot in the male member.

However, there are a number of disadvantages with this system. In particular, when the wireline is used for jarring operations the latch member tends to disengage from the slot in the male member due to the high longitudinal axial forces during jarring operations. This can result in rotation of the male member relative to the female member in a downhole situation, which could result in loss of one or more of the tools downhole.

In addition, these type of connectors have a tendency to rock about the diametric axis of the flanges which results in premature wear of the connector and possible failure of the connector.

SUMMARY OF THE INVENTION

In accordance with an aspect of the present invention, a connector comprises a female member, a male member for insertion into the female member and a latch, the male member having at least three circumferentially spaced flanges which, after insertion of the male member into the female member and rotation of the male member relative to the female member, co-operate with circumferentially extending recesses formed on the inside of the female member to prevent separation of the male and female members in an axial direction, and wherein the latch co-operates with the female and the male members after a predetermined angle of relative rotation of the male member in order to prevent subsequent relative rotation of the male member within the female member.

This aspect of the invention reduces the wear on the connector by providing at least three circumferentially spaced flanges which reduces possible rocking of the male member within the female member.

Preferably, the connector also comprises biassing means to bias the latch into co-operation with the female and the male members.

In accordance with another aspect of the present invention, a connector comprises a female member, a male member having at least one flange and for insertion into the female member, a latch and a biassing means, the male member being adapted to be inserted into the female member and rotated relative to the female member through a predetermined angle of rotation, so that the at least one flange on the male member engages with a circumferentially extending recess formed on the inside of the female member to prevent axial separation of the female member and the male member and so that the latch co-operates with the male and female members to prevent subsequent rotation of the male member relative to the female member, and wherein the biassing means acts on the latch in a direction transverse to the longitudinal axes of the male and female members to bias the latch into co-operation with the male and female members.

This aspect of the invention reduces the likelihood of the latch being bounced out of engagement with the male or female members during jarring operations by providing a biassing means which acts transversely to the longitudinal axes of the male and female members.

Typically, the latch is connected to the female member by a pivot and is biased into engagement with the male member via the biassing means which causes rotation of the latch about the pivot point into engagement with the male member. However, alternatively the latch and biassing means could be located on the male member and the biassing means could bias the latch into engagement with the female member.

In the preferred embodiment, the biassing means comprises a spring which is typically mounted so that the longitudinal axis of the spring is at substantially 90° to the longitudinal axis of the male and female members. Preferably, the spring is a helical spring however, a disc or other type of spring could be used.

Typically, there are three circumferentially spaced flanges which are spaced equidistant from each other on the male member.

Typically, at least two sets of circumferentially spaced flanges are provided on the male member and each set of circumferentially spaced flanges are spaced from each other along the longitudinal axis of the male member and are aligned with each other.

Typically, where the latch is on the female member, the latch is recessed within a main body section of the female member and insertion of a release member into the female member forces the latch out of engagement with the male member against the action of the biassing means. Typically, if the latch is located on the male member then an aperture could be provided in the female member which would enable the release member to be inserted through the female member to cause the latch to be disengaged from the female member against the action of the biassing means. Preferably, the release member is a finger of an operator. However, alternatively, a separate instrument, such as a punch could be used.

Preferably, the male member also comprises a shoulder which co-operates with a shoulder on the female member to help prevent rocking of the male member within the female member.

BRIEF DESCRIPTION OF THE DRAWINGS

An example of a connector in accordance with the invention will now be described with reference to the accompanying drawings, in which:

FIG. 1 is a side view of a male member of a connector for use in wireline operations;

FIG. 2 is an end view of the male member shown in FIG. 1 along the line AA;

FIG. 3 is an end view of a first example of the female member of the connector;

FIG. 4 is a partial cross-sectional view through the female member shown in FIG. 3;

FIG. 5 is a partial cross-sectional view of the male member shown in FIGS. 1 and 2 and a second example of a female member used in a "knuckle joint" application; and, FIG. 6 is a side view of the female member shown in FIG. 5.

DESCRIPTION OF PREFERRED EMBODIMENTS

FIGS. 1 and 2 show a male member 20 of a connector suitable for use in wireline operations. The male member 20 comprises two longitudinally spaced sets of three circumferentially spaced flanges 1 on a central section 21. One end of the central section 21 is connected to the main body portion of the male connector 20 and the other end 22 is of frusto-conical shape and has three slots 3 formed in it.

A female member 30 for connection to the male member 20 is shown in FIGS. 3 and 4. The female member 30 comprises a latch 4 which is pivoted on the female member 30 at a pivot point 5 and is biased towards the position shown in FIG. 4 by means of a helical spring 6 located in a bore 45. Within a central bore 10 of the body of the female member 30 there are recesses 11 formed by two longitudinal sets of three circumferentially spaced flanges 31 on the inside of the female member 30.

In use, the external "triangular" profiled flanges (two sets longitudinally) 1 on the male member are lined up with the similar internal "triangular" profile machined within the female member.

The female member is pushed over the male connector until its leading face 32 comes against the shoulder 9 on the male member.

By rotating the male and female members 20, 30 relative to each other by 1/6th of a revolution, the flanges 1 will be engaged within the grooves 11. Also the latch 4 will be engaged in one of the three slots 3, thus stopping any further rotation.

As the female member 30 is pushed over the male member 20, the latch 4 is pushed outward rotating clockwise (see FIG. 4) about the pin 5 against the resistance of the spring 6. When the male member 20 is rotated 1/6th of a revolution, relative to the female, one of the three slots 3 will align with the latch 4, when this occurs the spring 6 will force the latch 4 back so that it locates into the slot 3 (one of three) machined into the male member.

The latch 4 is shaped in such a way as to allow it to rotate only in a clockwise direction from the rest position, shown in FIG. 4. Also because of it's shape, both radiused ends 35, 36 of the latch 4 will touch either side of the slot 7 when in the rest position (as shown). In this position (without the male member 20 engaged) the spring 6 will be unable to rotate the plate in an anti-clockwise direction.

To release the connector, a punch (not shown) is inserted into the spring housing hole 8 to push the latch 4 and disengage it from the slot 3 on the male member. To disengage the male and female connectors it is then necessary to rotate them relative to each other by 1/6th of a revolution in any direction.

FIG. 5 shows a second example of a female member 40 which is identical to the female member 30, except that the configuration and arrangement of the latch mechanism is slightly different. Sections of the female member 40 which are identical to the female member 30 in FIGS. 3 and 4 are labelled with the same reference numerals.

In the female member 40 there is a latch 41 mounted within a recess 42 in the female member 40 (see also FIG. 6) by means of a pivot 43.

The latch 41 has two lugs 44 (only one shown in FIG. 5) which extend beyond the edges of the recess 42 so that they are located within the central bore 10 of the female member 40. When a male member 20 is not inserted into the female member 40 the latch 41 is biased to the position shown in FIG. 5 by the helical spring 6. In this position the lugs 44 abut against the inner edges of the recess 42 and prevent the helical spring 6 rotating the latch 41 anti-clockwise. Hence, the lugs 44 retain the latch 41 within the female member 40 when a male member 20 is not inserted into the female member 40.

FIG. 6 is a side view of the female member 40 with the latch 41 and helical spring 6 removed, so that the bore 45 can been seen. Also shown is a depression 46 machined into the outside surface of the female member 40. This allows a finger of an operator to be inserted to rotate the latch 41 against the action of the spring 6, in order to release the latch from engagement with one of three slots 3 in the male member when the male member 20 is connected to the female member 40, so that the members 20, 40 may be disconnected.

One of the main advantages of the transverse spring arrangement shown in the female members 30, 40 is that the latch is not prone to movement by jarring operations which means that a relatively weak spring 6 can be used. This means that no special tools need be used to release the latch 41 and the latch can be released easily by an operator pressing a finger against the latch 41 to disconnect the male member from the female member.

FIG. 5 also shows the female member 40 and the male member 20 being used in a "knuckle joint" application where the female member 40 is connected to a ball position 47 located within a socket portion 48 which is connected to the male member 20. Hence, the knuckle joint may be easily and quickly connected into a toolstring which is connected together with similar male and female members 20, 30, 40.

Modifications and improvements may be incorporated without departing from the scope of the invention.

I claim:

1. A connector comprising:
   a female member;
   a circumferentially extending recess formed on the inside of said female member;
   a male member;
   a flange formed on the outside of said male member;
   said male member being adapted to be inserted into said female member and rotated relative to said female member from a first position through a predetermined angle of rotation to a second position in which said flange on said male member engages with said recess formed on said female member to prevent axial separation of said female member and said male member;

latch means movable from a release position permitting relative rotation of said male member and said female member to a locking position where relative rotation of said male member and said female member is prevented; and, biassing means acting on said latch means in a direction transverse to the longitudinal axes of said male and female members to bias said latch means into said locking position to prevent relative rotation of said male member and said female member.

2. A connector according to claim 1, further comprising a pivotal coupling which pivotally couples the latch to one of the female member and the male member so that the latch pivots into engagement with the other of the male member and the female member.

3. A connector according to claim 2, wherein the axis of the pivotal coupling is transverse to the longitudinal axes of the members.

4. A connector according to claim 1, wherein there are three circumferentially spaced flanges on the male member.

* * * * *